United States Patent [19]

Chorkey

[11] Patent Number: 4,548,238
[45] Date of Patent: Oct. 22, 1985

[54] DIRECTIONAL CONTROL VALVE WITH STRAIGHT THROUGH FLOW

[76] Inventor: William J. Chorkey, 34300 Lyncroft, Farmington, Mich. 48024

[21] Appl. No.: 563,060

[22] Filed: Dec. 19, 1983

[51] Int. Cl.⁴ .......................................... F15B 13/042
[52] U.S. Cl. ........................... 137/625.25; 137/625.6; 137/625.64; 137/625.66; 137/874
[58] Field of Search ........... 137/625.25, 625.6, 625.64, 137/625.66, 874, 875

[56] References Cited

U.S. PATENT DOCUMENTS 3,349,800 10/1967 Herion et al. .................. 137/625.66
3,530,893 9/1970 Masuda .......................... 137/625.25

FOREIGN PATENT DOCUMENTS 1213187 3/1966 Fed. Rep. of Germany ........................ 137/625.64
1288389 1/1969 Fed. Rep. of Germany ........................ 137/625.64

Primary Examiner—Gerald A. Michalsky
Attorney, Agent, or Firm—Irvin L. Groh

[57] ABSTRACT

A reversing, four-way, two position fluid directional control valve having a valve body with an enclosed chamber therein and at least two oppositely disposed sides. Two outlet ports are formed through one of the two sides, and they communicate with the chamber, and an inlet port is formed through the other of the two sides and it communicates with the chamber. At least one exhaust or fluid return port communicates the chamber to the exterior of the valve body. A slider valve element means is mounted in the chamber and it is movable between two operating positions, for providing a straight through fluid flow path through the valve body, from the inlet port to a selected one of the outlet ports. The outlet ports exhaust through the chamber and at least one exhaust or fluid return port.

5 Claims, 9 Drawing Figures

DIRECTIONAL CONTROL VALVE WITH STRAIGHT THROUGH FLOW

TECHNICAL FIELD

This invention relates generally to the valve art, and more particularly to an improved directional fluid control valve which is constructed and arranged so as to provide a straight through flow of fluid from the inlet port to the outlet or cylinder ports. The valve of the present invention is adapted for use as an air or hydraulic directional fluid control valve of the four-way, two-position, reversing type, and the like, for directing fluid to control apparatuses such as air or hydraulic cylinders, for operating various types of machine tools, and for other industrial applications.

BACKGROUND ART

It is well known in the valve art that the most efficient flow path for pressure fluid entering a directional control valve and exiting out of an outlet or cylinder port in the valve is one which is as short as possible. Heretofore, the prior art four-way, two-position directional fluid control valves, and the like, ordinarily required a base member on which was mounted a body member carrying a valve spool member, and with the inlet and outlet passages extending through both the base member and the body member, and then back into the base member for outlet purposes. Such prior art valve structures require many right angle turns in the flow of the fluid through the valve. For example, in valves having the inlet port and exhaust ports on one side of a base member, and the outlet ports or cylinder ports on the other side of the base member, there are required at least a total of eight horizontal and vertical plane, right angle turns to be made by the fluid flowing through the valve, between the inlet port and the outlet or cylinder ports. U.S. Pat. No. 3,680,596 discloses a spool type reversing valve, which has a valve spool slidably mounted in a valve body, which is in turn mounted on a valve base. When the fluid passes through a valve such as that shown in the last mentioned patent, it must make many right angle turns, at each of which there is a major pressure loss or drop. In an attempt to decrease the number of right angle turns in a fluid flow circuit through a four-way, directional reversing valve, it has been heretofore proposed that a circular fluid flow path through the valve body be employed to increase the flow efficiency. However, the circular fluid flow path employed in the last mentioned patent still employs many right angle turns. Another prior art directional reversing valve, with many right angle turns, is shown in U.S. Pat. No. 3,952,775.

DISCLOSURE OF THE INVENTION

In accordance with the present invention, a directional fluid control reversing valve is provided for use in air or hydraulic oil directional fluid control applications. The invention can be incorporated in a four-way, two-position, reversing type directional fluid control valve, and the like, for directing fluid, as air or hydraulic oils to a control apparatus, such as a cylinder, for operating various types of machine tools, and for other industrial applications. The valve of the present invention is constructed and arranged to provide for a straight through flow of air or hydraulic oil from the inlet port of a valve to an outlet or cylinder port, and from an outlet or cylinder port to an exhaust port, or oil return port.

In some embodiments of the present invention, the valve includes a body having an exhaust chamber formed therein which is open on the lower end thereof. A bottom plate encloses the lower end of the exhaust chamber in the valve body. A pair of outlet or cylinder ports are formed in one of the walls of the valve body as, for example, the top end wall. An inlet port is formed in the bottom plate. At least one exhaust or oil return to tank port is formed through the bottom plate. In a further embodiment of the invention, the pair of outlet or cylinder ports are formed through one of the walls of the valve body, and the inlet and at least one exhaust or oil return port is formed through an opposite side wall in the valve body. In all embodiments of the invention a slider valve element is provided for controlling the flow of fluid from an inlet port to a selective one of a pair of outlet ports, for exhausting fluid from the other outlet port to an exhaust or oil return port. An operator means is provided for moving the slider valve element between the outlet ports in a reversible and slidable manner. The straight through fluid flow valve of the present invention is advantageous because it is simple in structure, efficient in operation, and economical to manufacture. Another advantage of the valve of the present invention, with the straight though fluid flow path, is that it many be quickly and easily repaired at a minimum of cost, and it may be used in a stacked arrangement, as well as on a detachable base.

BEST MODE OF THE INVENTION

Figure 1:
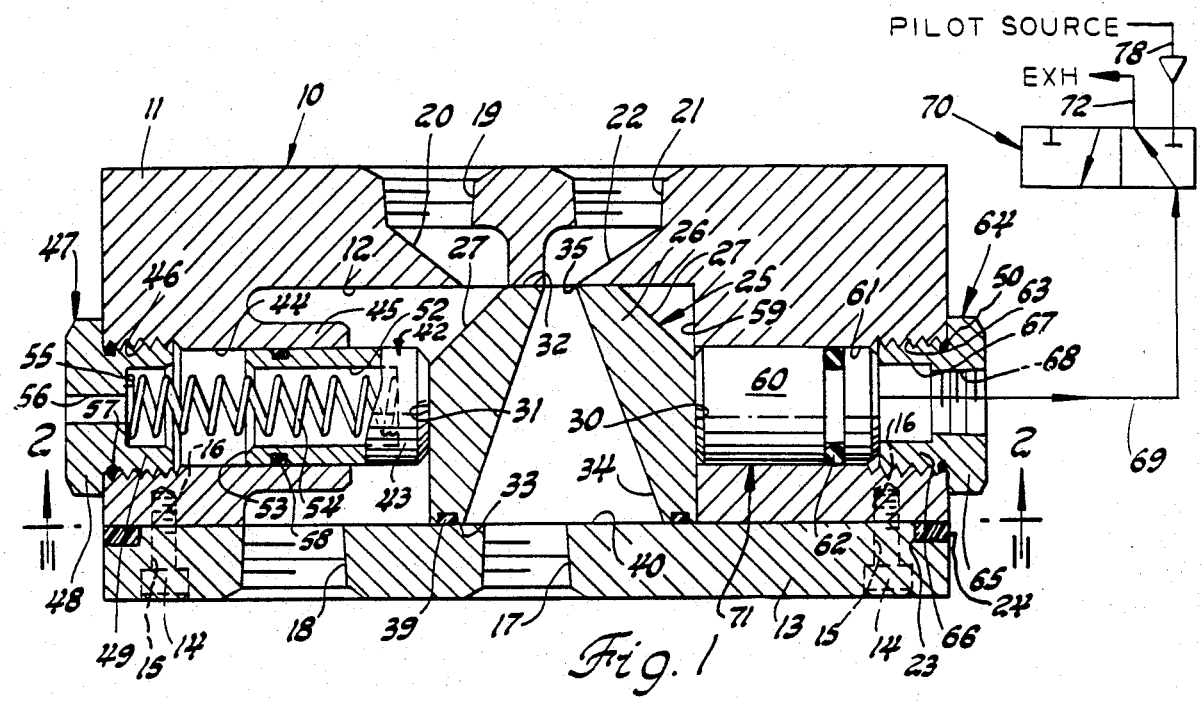
FIG. 1 is an elevation section view of a four-way, two-position directional fluid control, reversing valve, taken along the line 1—1 of FIG. 2, and looking in the direction of the arrows.
Figure 2:
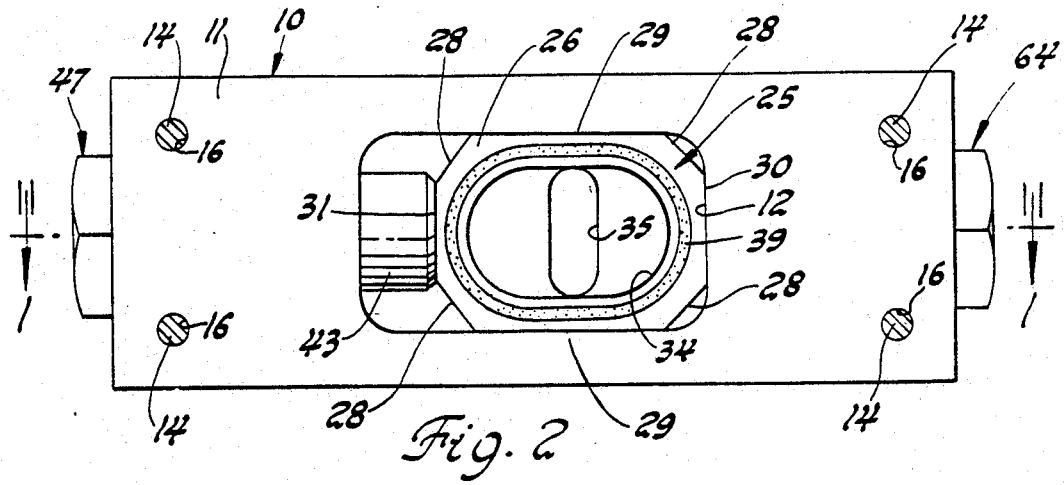
FIG. 2 is a bottom plan view of the valve structure illustrated in FIG. 1, with the bottom plate removed, taken along the line 2—2 thereof, and looking in the direction of the arrows.

Referring now to the drawings, and in particular to FIGS. 1 and 2, the numeral 10 generally designates a four-way, two-position directional fluid control, reversing valve having a straight through flow path, and made in accordance with the principles of the present invention. The valve 10 includes a valve body 11 which is shaped as a rectangular block and open at the lower end thereof, and which has mounted on the lower end thereof a bottom plate 13. The bottom plate 13 is releasably secured to the valve body 11 by a plurality of suitable machine screws 14, which pass through bores 15, formed through the bottom plate 13, and into threaded engagement with threaded bores 16 formed in the lower end of the valve body 11.

As shown in FIGS. 1 and 2, the valve body 11 is provided with an internal exhaust chamber 12, which is open at the lower end thereof and enclosed by the bottom plate 13. A suitable seal member 23 is mounted around the upper end periphery of the bottom plate 13, and it is disposed in a suitable peripheral or circumferential recess 24 formed in the upper side 40 of the bottom plate 13. A threaded inlet port 17 and a threaded exhaust or oil return port 18 are formed through the bottom plate 13. The valve 10 is provided with a pair of threaded outlet or cylinder ports 19 and 21 which are formed in the upper end of the valve body 11, and they communicate at their inner ends with the exhaust chamber 12 by means of the passages 20 and 22, respectively. The inlet port 17 is adapted to be connected to a suitable source of fluid under pressure as, for example, a source of pressurized air or pressurized hydraulic fluid.

As shown in FIG. 1, the valve 10 includes a slider valve element, generally indicated by the numeral 25 which is slidably mounted in the exhaust or return chamber 12. The slider valve element 25 is illustrated as a rectangular, block shaped body 26, which is provided with front and rear sloping shoulders 27 on the upper end thereof. It will be understood, that the slider valve body 26 may also be of another shape, as cylindrical. As shown in FIG. 2, the vertical corners of the block shaped slider valve element body 26 are chamfered or cut off as indicated by the numerals 28. As shown in FIG. 1, the sides of the slider valve element body 26 are indicated by the numerals 29 and the vertical end surfaces are indicated by the numerals 30 and 31. As shown in FIG. 1, the upper end surface 32 slidably engages the upper end surface of the exhaust or return chamber 12, and the lower end 33 thereof, is slidably mounted on the inner surface 40 of the bottom plate 13.

As shown in FIG. 2, the lower end of the slider valve element body 26 has an elongated opening formed therein, which is provided with rounded corners and which extends upwardly in a conical passage 34, as shown in FIG. 1, to an exit opening or slot 35. As shown in FIG. 2, the slot 35 is an elongated opening with rounded corners which is disposed with its longer axis perpendicular to the longest axis of the passage 34, at the lower end of the slider element body 26. As shown in FIGS. 1 and 2, the lower end 33 of the slider valve element body 26 is provided with a peripheral seal 39, around the lower end of the passage 34, for sealing engagement with the inner surface 40 of the bottom plate 13.

As shown in FIG. 1, the slider valve element 25 is moved to a first operating position, and held at said position, by an operator biasing means, as a return spring means, generally indicated by the numeral 42. The return spring means 42, includes a return spring piston 43 which is slidably mounted in a bore 44 formed in the valve body 11 and boss 45. The inner end of the bore 44 communicates with exhaust or return chamber 12. The return spring piston 43 is mounted in the inner end of the bore 44, with its inner end in abutment with the end 31 of the slider valve element 25. The return spring means 42 further includes a spring retainer generally indicated by the numeral 47, which has an enlarged head 48 and a reduced diameter integral threaded shaft 49 on the inner end thereof. The spring retainer threaded shaft 49 is threadably mounted in a threaded bore 46, which is formed in the valve body 11 in an axial position in alignment with the return spring piston bore 44.

As shown in FIG. 1, the return spring piston 43 has a cylindrical spring chamber 52 formed therein which extends inwardly from its outer end 53. The inner end of a return spring 54 is seated in the spring chamber 52, with the inner end of the spring 54 abutting against the inner end wall of the spring chamber 52. The outer end of the return spring 54 is seated in a recess 55, formed in the inner end of the spring retainer shaft 49. The cylindrical recess 55 in the spring retainer shaft 49 is vented to the atmosphere by an axial bore 56. The spring retainer 47 is provided with a suitable O-ring seal 57 around the outer end of the reduced diameter threaded shaft 49. The return spring piston 43 is also provided with a suitable annular seal 58 around the outer periphery thereof, adjacent to the rear end thereof, as for example, an O-ring seal.

As shown in FIG. 1, the valve 10 includes a cylindrical piston-type operator, generally indicated by the numeral 71, which includes a cylindrical piston 60 and a piston retainer, generally indicated by the numeral 64. The return spring means 42 normally urges the slide valve element 25 to the right, to the first operating position, as shown in FIG. 1, against the right end wall 59 of the exhaust or return chamber 12. In the position shown in FIG. 1, the slider valve element right end 30 also engages the inner end of the operator piston 60 and biases it outwardly into abutting engagement with the inner end of a threaded retainer shaft 66 which is threadably mounted in a threaded bore 63 in the valve body 11. The threaded shaft 66 is integral with an enlarged head 65 which abuts the outer side of the valve body 11 when in the position shown in FIG. 1. The operator piston 60 is slidably mounted in a bore 61, that is aligned with the spring piston bore 44 and which is aligned with a pilot fluid pressure operator chamber 67 in the inner end of the retainer shaft 66. A threaded bore 68 is formed thgrough the outer end of the retainer head 65, and it communicates with the operator chamber 67. The operator piston 60 is provided with a suitable O-ring seal 62 in a suitable groove around the periphery thereof for sealing engagement with the surface of the bore 61. The retainer 64 is provided with a suitable O-ring seal 50.

As illustrated in FIG. 1, pressurized pilot fluid is conducted to the pilot fluid inlet port 68 by a suitable conduit 69, which is connected to a directional control valve, generally indicated by the numeral 70. The directional control valve 70 is a conventional type valve, and it has an exhaust line 72, and a supply line 78 connected to a suitable source of pressurized pilot fluid. When the directional control valve 70 is in the first operating position shown in FIG. 1, the pilot fluid would be exhausted from the operator chamber 67. When the directional control valve 70 is moved to the right, as viewed in FIG. 1, by any suitable means, as by a manual means or a solenoid operated means, the operator chamber 67 is connected to the source of pilot fluid by the supply lines 69 and 78, and pressurized pilot fluid is conducted into the operator chamber 67 for moving the operator piston 60 to the left, to move the slider valve element 25 to a second operating position. In the first operating position shown in FIG. 1, the slider valve element 25 has its lower end in communication with the working pressure inlet port 17 and its upper slot end 35 in communication with the passage 22 and the outlet port 21. The outlet port 19 is in communication with the exhaust or oil return port 18 through the passage 20 and the exhaust or return chamber 12. When the slider valve element 25 is moved to the second position by the last described movement of the operator piston 60, the slider valve element 25 then connects the inlet port 17 with the outlet port 19 through the passage 20. Simultaneously, the outlet port 21 is connected through the passage 22 and the exhaust chamber 12 to the exhaust or oil return port 18.

When it is desired to move the slider valve element 25 back to the first operating position, shown in FIG. 1, the directional control valve 70 is reversed to move it back to the position shown in FIG. 1, so as to cut off the supply of pressurized pilot fluid to the operator chamber 67 and to exhaust the pressurized fluid that is within that chamber, and permit the return spring means 42 to return the slider element 25 to the first operating position shown in FIG. 1.

It will be understood, that the longitudinal axis of the inlet port 17 and the outlet ports 19 and 21 are co-planar, and that when the slider valve element 25 is in either the first or second operating position pressurized fluid from the inlet port 17 passes through the slider valve element 25 and out one of the respective outlet ports 19 or 21 in a straight through flow path, without the need for making any right angle turns, on either a horizontal plane or a vertical plane.

The upper end 32 of the slider valve element 25 engages the upper surface of the exhaust or return chamber 12 throughout the sliding path of the valve element 25, and said upper end surface 32 and the surface of the exhaust chamber are each provided with a very fine finish, since a metal to metal contact occurs therebetween. The valve body 11, the bottom plate 13 and the slider valve element 25 may be made from any suitable material as, for example, a metal, as stainless steel, a hard coated aluminum, and the like. It will be understood that the seating contact between the upper end of the slider valve element 25 and the upper face or end of the exhaust or return chamber 12 is also assisted by the pressure of the operating fluid in the conically shaped passage 34, in the slider valve element 25. The pressure in the conically shaped passage 34 of the sliding valve element 25 provides a pressure seal between the slider valve element upper end 32 and the upper end surface of the exhaust or return chamber 12 due, to the conical shape of the passage 34 and the directional flow of pressurized fluid therethrough.

In one embodiment, wherein the pressure of the working fluid in a conically shaped passage 34 was a 100 pounds per square inch, a pressure assist seal of approximately 11 pounds was produced, which was added to the sealing action between the slider valve element upper surface 32 and the upper end surface of the exhaust or return chamber 12. It will be understood, that the amount of pressure assist will vary with the size of the slider valve element 25 and the area available in the passage 34 for engagement by the pressure of the working fluid in the passage 34.

Figure 3:
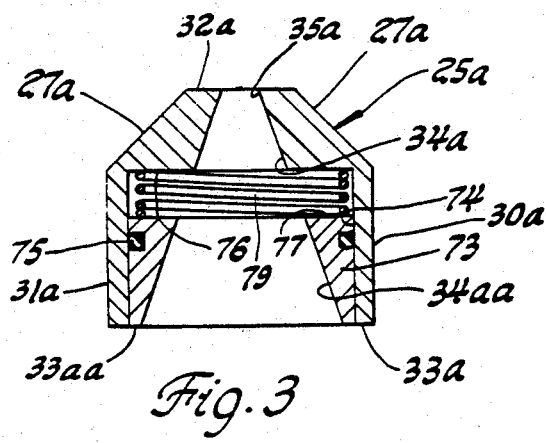
FIG. 3 is an elevation section view of a second embodiment of a slider valve element which may be employed in the valve embodiment of FIGS. 1 and 2.

FIG. 3 illustrates another type of slider valve element 25a for use in the embodiment of FIGS. 1 and 2, and the parts of the sliding valve element 25a illustrated in FIG. 3 which are the same as the slider valve element 25 of FIGS. 1 and 2 have been marked with the same reference numerals followed by the small letter "a". In the slider valve element 25a of FIG. 3 the conical passage 34 therethrough is formed in two parts, with an upper part 34a being formed in the integral upper portion and a lower portion 34aa being formed in a movable internal cylindrical piston 73. The piston 73 is slidably mounted in a cylindrical bore 74 which is formed in the lower end of the slider valve element 25a and extended upwardly therefrom. The piston 73 is provided with a suitable O-ring seal 75, which is operatively mounted in an annular groove in the outer periphery of the piston 73. The upper or inner end of the piston cylindrical bore 74, in the slider valve element 25a, is indicated by the numeral 76, and the inner or top end of the piston 73 is indicated by the numeral 77. A coil spring 79 is operatively mounted in the bore 74, between the bore upper end 76 and the top end 77 of the piston 73, to bias the piston 73 downwardly, as viewed in FIG. 3.

It will be seen that when the slider valve element 25a is employed in the valve structure of FIGS. 1 and 2, the pressure of the working fluid passing upwardly through the passages 34aa and 34a will also operate in the area between the piston upper surface 77 and the inner end surface 76 of the bore 74, so as to provide a pressure assist to the spring 79 for moving the piston 73 downwardly into sealing engagement against the inner surface 40 of the valve bottom plate 13 and the upper end surface 32a of the slider valve element 25a against the upper end of the exhaust chamber 12 and provide a pressure assist seal at that point. The lower ends 33a and 33aa of the slider valve element 25a and the piston 73, respectively, slide on the bottom plate inner surface 40, in a metal to metal sliding contact, without the use of any seal. The slider valve element 25a would be moved between the first and second operating positions, described hereinbefore for the embodiment of FIGS. 1 and 2, by the same aforedescribed piston operator and spring return means employed in the embodiment of FIGS. 1 and 2.

Figure 4:
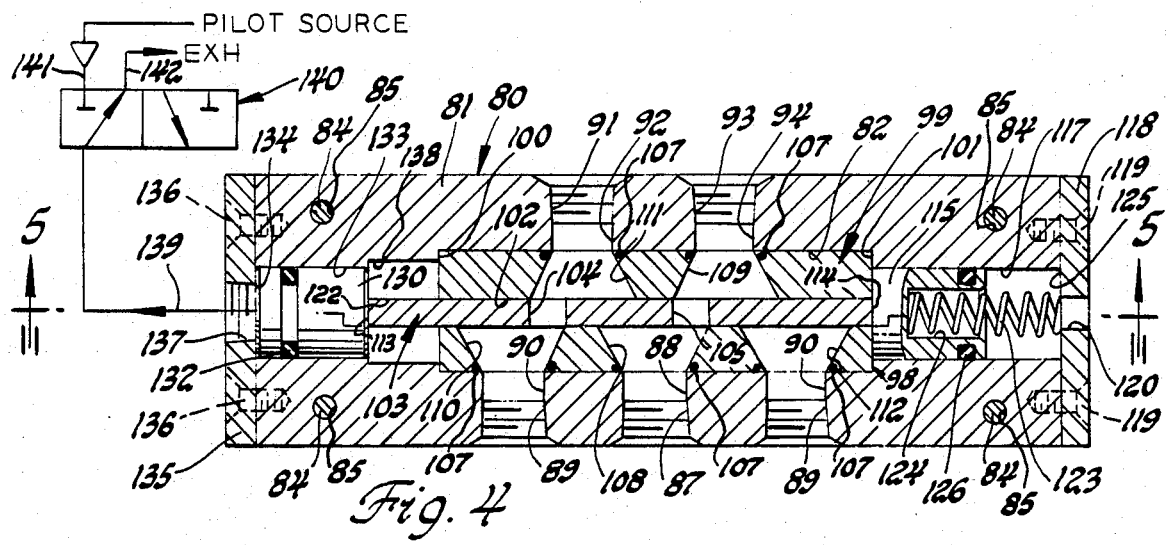
FIG. 4 is a horizontal section view, of a second embodiment of a valve made in accordance with the principles of the present invention, taken along the line 4—4 in FIG. 5, and looking in the direction of the arrows.
Figure 5:
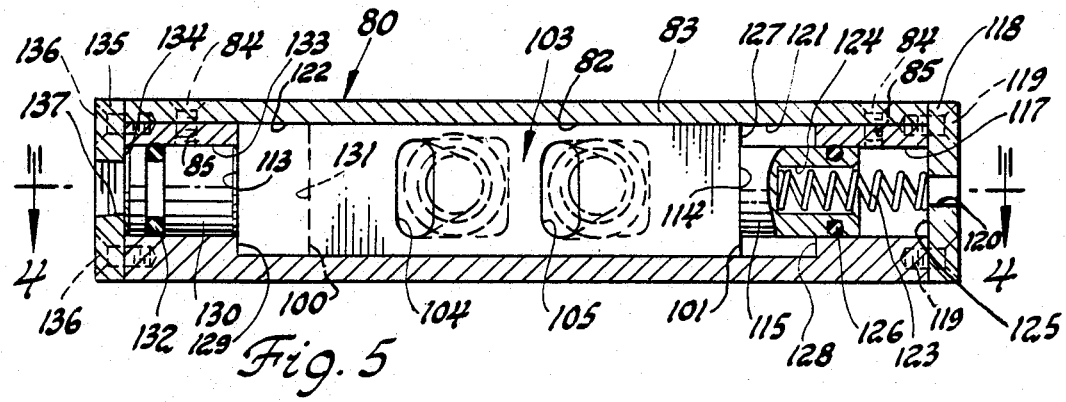
FIG. 5 is an elevation section view of the valve structure illustrated in FIG. 4, taken along the line 5—5 thereof, and looking in the direction of the arrows.
Figure 6:
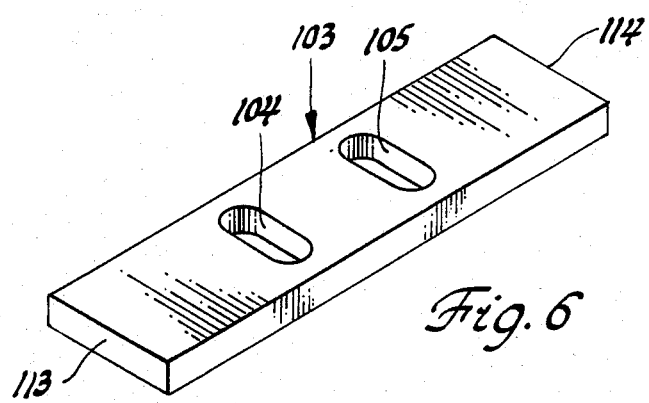
FIG. 6 is an elevation perspective view of the slider valve element employed in the second valve embodiment illustrated in FIGS. 4 and 5.

FIGS. 4, 5 and 6 illustrate a second valve embodiment 80 made in accordance with the principles of the present invention. The valve 80 is a four-way, two position directional fluid control, reversing valve having a straight through flow path. The valve 80 includes a valve body 81 which is substantially rectangular block-shaped in overall configuration, and in which is formed a valve chamber 82 that is open on the upper end thereof. As shown in FIG. 5, the upper end of the chamber 82 is enclosed by a top plate 83 which is releasably secured to the valve body 81 by a plurality of suitable machine screws 84, which are mounted through the top plate or cover 83 and into threaded engagement with threaded bores 85 in the body 81.

As shown in FIG. 4, a threaded inlet port 87 is formed in one side of the valve body 81, and it communicates at its inner end with a passage 88 that communicates with the valve chamber 82. A pair of threaded exhaust ports 89 are also formed in said one side of the valve body 81, on opposite sides of the inlet port 87, and their inner ends each communicate through a passage 90 with the valve chamber 82. The inlet port 87 is adapted to be connected to a suitable source of fluid under pressure as, for example, a source of pressurized air or pressurized hydraulic fluid.

As shown in FIG. 4, a pair of outlet ports 91 and 93 are formed in the other side of the valve body 81, in positions co-planar with the inlet port 87 and the exhaust or oil return ports 89. The inner ends of the outlet ports 91 and 93 are connected by passages 92 and 94, respectively, with the valve chamber 82. A pair of oppositely disposed, elongated valve element guide plates 98 and 99 are seated in the valve chamber 82, and their ends are seated against the longitudinal ends 100 and 101 of the valve chamber 82. Slidably mounted in a longitudinally extended slot 102 between the inner faces of the guide plates 98 and 99 is a rectangular plate-like slider valve element, generally indicated by the numeral 103. As shown in FIGS. 4, 5 and 6, the slider valve element 103 has formed therethrough a pair of longitudinally spaced apart, transversely disposed, flow control passages 104 and 105.

The slider valve element 103 is shown in FIGS. 4 and 5 in a first operating position, so as to connect the inlet port 87 with the outlet port 93, and the outlet port 91 with the left or oil return exhaust port 89. The inlet port 87 communicates through the passage 88 to a passage 108 formed in the valve element guide plate 98, and thence through the valve element flow control passage 105 and a passage 109 in the valve guide plate 99, and the passage 94 to the outlet port 93. The outlet port 91 is connected to the left exhaust or oil return port 89 by the passage 92, a passage 111 in the valve guide plate 99, the flow control passage 104 in the slider valve element 103, a passage 110 in the valve guide plate 98, and the passage 90. When the slider valve element 103 is shifted to the right, as viewed in FIGS. 4 and 5, to a second operating position, the aforedescribed flow paths between the inlet port 87 and the outlet ports 91 and 93 are reversed. That is, the outlet port 93 is connected through the passage 94 to the passage 109 in the valve guide plate 99, the flow control passage 105 in the slider valve element 103, the passage 112 in the valve guide plate 98, and the passage 90 to the right exhaust or oil return port 89. The inlet port 87 is connected through the passage 88, and the passage 108 in the valve guide plate 98, the flow control passage 104 in the slider valve element 103, the passage 111 in the valve guide plate 99, and the passage 92, to the outlet port 91.

As shown in FIG. 4, each of the valve guide plates 98 and 99 is provided with suitable O-ring seals 107 for engagement with the adjacent surfaces of the valve chamber 82 for sealing around each of the passages 108 through 112. Each of the passages 108 through 112 in the valve guide plates 98 and 99 are formed to a conical shape, so as to diverge inwardly.

As shown in FIGS. 4, 5 and 6, the ends of the slider valve element 103 are designated by the numerals 113 and 114. The slider valve element 103 is moved to the first operating position, shown in FIGS. 4 and 5, by a spring operator means comprising an operator piston 115, which engages the end 114 of the slider valve element 103, and a return spring 123. The operator piston 115 is slidably mounted in a cylindrical bore 117, formed in the right end of the valve body 81. The outer end of the cylindrical bore 117 is enclosed by a detachable end plate 118, which is releasably secured to the right end of the valve body 81, as viewed in FIG. 4, by a plurality of suitable machine screws 119. The cylindrical bore 117 is vented to the atmosphere through an axial vent hole 120. As shown in FIG. 4, the return spring 123 has its inner end seated against the inner end wall of an axial recess 124, that is formed in the operator piston 115, and which extends inwardly from the outer end thereof. The outer end of the return spring 123 is seated against the inner face 125 of the cover plate 118. The operator piston 115 is provided with a suitable O-ring seal 126, which is mounted in a groove formed around the outer periphery thereof.

As shown in FIG. 4, the slider valve element 103 is longer than the valve guide plates 98 and 99. Accordingly, when the slider valve element 103 is in the first position shown in FIGS. 4 and 5, the left end extends through a slot 122 and seats against the inner end of a pilot fluid operator piston 130. The slot 122 extends through a bore 138 which communicates with the valve chamber 82 at its inner end, and with a cylindrical pilot fluid chamber or bore 133 at its outer end, and in which is slidably seated the operator piston 130. As shown in FIG. 5, the ends of the slider valve element slot 122 are indicated by the numerals 129 and 131. A similar slider valve element slot 121 is formed at the other end of the valve chamber 84, and the ends thereof are indicated in FIG. 5 by the numerals 127 and 128.

As shown in FIGS. 4 and 5, when the operator piston 130 is in the first operating position, the outer end thereof is seated against the inner surface 134 of an end cover plate 135 which is fixedly secured to the valve body 81 by any suitable means, as by a plurality of suitable machine screws 136. The operator piston 130 is provided with a suitable O-ring seal 132 which is mounted in a groove around the periphery thereof, for sealing engagement with the surface of the pilot fluid cylindrical chamber 133. A threaded pilot fluid port 137 is formed through the cover end plate 135, and it communicates at its inner end with the outer end of the cylindrical pilot fluid chamber 133 and the outer end of the operator piston 130. As shown in FIG. 4, pressurized pilot fluid is conducted to the pilot fluid inlet port 137 by a suitable conduit 139, which is connected to a suitable directional control valve, generally indicated by the numeral 140. The directional control valve 140 is a conventional type valve, and it has an exhaust line or oil return to tank line 142, and a supply line 141 which is adapted to be connected to a suitable source of pressurized pilot fluid.

In use, when the slider valve element 103 is in the first operating position shown in FIG. 4, the directional control valve 140 is in the first operating position shown in FIG. 4, so that the pilot fluid is exhausted from the pilot fluid port 137 and the operator piston bore or chamber 133. The slider valve element 103 is maintained in the first operating position shown in FIG. 4 by the action of the return spring 123 and the return spring operator piston 115, which engages the end 114 of the slider valve element 103. When the directional control valve 140 is moved to the left, as viewed in FIG. 4, by any suitable means, as by a manual means or a solenoid operated means, the pilot fluid chamber or bore 133 is connected to the source of pressurized pilot fluid by the conduit 139 and the supply line 141. Pressurized pilot fluid is then conducted into the port 137 and the pilot fluid chamber bore or chamber 133 for moving the operator piston 130 to the right, to move the slider valve element 103 to the second operating position. When the slider valve element 103 is in the second operating position, the flow from the inlet port 87 to the outlet ports 91 and 93 is reversed from the position shown in FIG. 4, as previously described. When the directional control valve 140 is reversed to move it back to the position shown in FIG. 4, the supply of pressurized fluid is cut off from the pilot chamber or bore 133, and the pressurized fluid therein is exhausted through the conduit 139 and the exhaust line 142, so as to permit the return spring 123 to return the slider valve element 103 to the first operating position shown in FIG. 4.

The valve body 81, the top plate 83, the end plates 118 and 135, the valve guide plates 98 and 99, and the slider valve element 103 may be made from any suitable material, as, for example, a metal, a stainless steel, a hard coated aluminum, and the like. The slider valve element 103 is slidably mounted between the valve guide plates 98 and 99 with a sliding metal-to-metal contact, and the abutting surfaces of these parts are provided with a very fine finish. The term "exhaust port", as used hereinafter in the claims, is meant to be a port for all types of fluids controlled by the valve and, accordingly, includes a port for exhausting air to the atmosphere or to an exhaust conduit, as well as a port for exhausting or returning hydraulic oil from a hydraulic apparatus being controlled by the valve and returning it to a suitable conduit for conveyance to a sump or reservoir.

Figure 7:
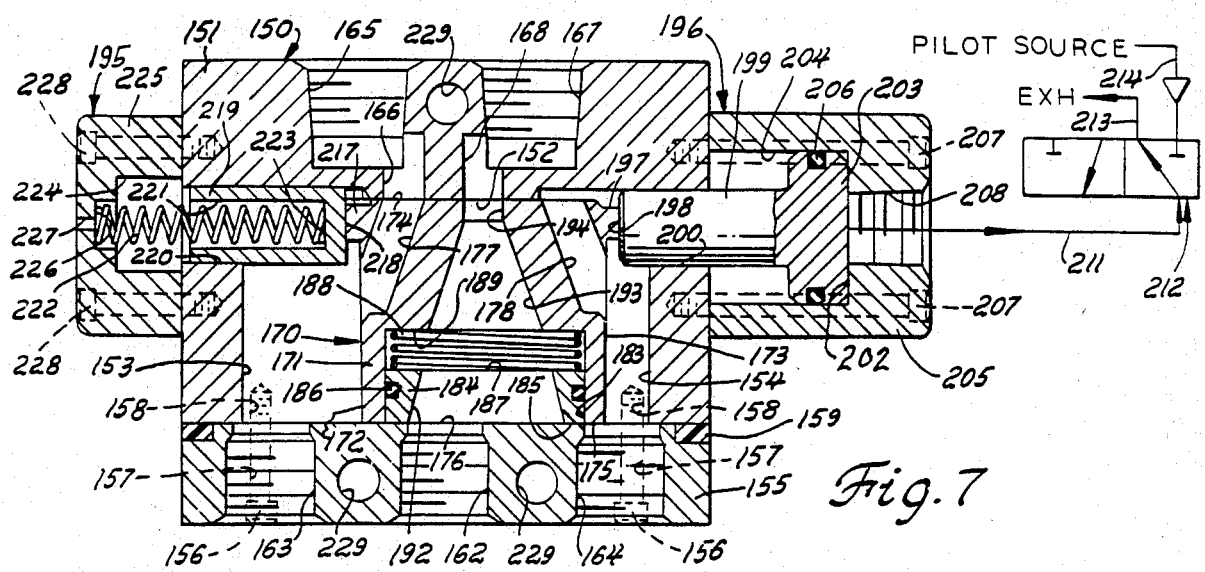
FIG. 7 is a vertical elevation section view, of a third embodiment of a valve made in accordance with the principles of the present invention.

FIG. 7 is a vertical, elevational section view of a third valve embodiment made in accordance with the principles of the present invention, and generally indicated by the numeral 150. The valve 150 is a four-way, two position directional fluid control reversing valve, having a straight through flow path. The valve 150 includes a valve body 151 which is substantially rectangular block shaped in overall configuration, and in which is formed an exhaust and valve chamber 152 that is open on the lower end thereof. The end walls of the chamber 152 are indicated in FIG. 7 by the numerals 153 and 154. The open lower end of the chamber 152 is enclosed by a bottom plate 155, which is releasably secured to the valve body 151 by a plurality of suitable machine screws 156. The machine screws 156 are mounted through suitable bores 157 formed through the plate 155, and they extend into threaded engagement with threaded bores 158 formed in the lower end of the valve body 151. A suitable seal member 159 is mounted around the upper end periphery of the bottom plate 155, and it is disposed in a suitable peripheral circumference recess formed in the upper side of the bottom plate 155 and it sealingly engages at its upper side the lower peripheral edge of the valve body 151.

As shown in FIG. 7, a threaded inlet bore 162 is formed through the bottom plate 155. A pair of threaded exhaust or oil return ports 163 and 164 are also formed through the bottom plate 155, and they are disposed with their longitudinal axes co-planar with the longitudinal axis of the inlet port 162. The valve 150 is provided with a pair of threaded outlet or cylinder ports 165 and 167, which are formed in the upper end of the valve body 151, and they communicate at their inner ends with the chamber 152 by means of the passages 166 and 168, respectively. The inlet port 162 is adapted to be connected to a suitable source of fluid under pressure as, for example, a source of pressurized air or pressurized hydraulic fluid.

As shown in FIG. 7, the valve 150 includes a slider valve element means, generally indicated by the numeral 170, which is slidably mounted in the exhaust or valve element chamber 152. The slider valve element means 170 is illustrated as having a substantially rectangular or block shaped body 171, which is provided with the left and right end sides 172 and 173. The upper end surface 174 of the slider valve element 170 slidably engages the upper end surface of the exhaust or valve chamber 152, and the lower end 175 thereof, is slidably mounted on the inner surface 176 of the bottom plate 155. A pair of downwardly and outwardly sloping exhaust passages 177 and 178 are formed through the upper opposite ends of the slide valve element body 171, with their upper ends opening at the slider valve element upper end surface 174 and their lower ends opening sidewise into the adjacent area of the exhaust or valve chamber 152.

As shown in FIG. 7, a cylindrical bore or piston chamber 183 is formed in the lower end of the slider valve element means 170, and it extends upwardly from the lower end thereof and terminates at an upper end wall 189. A cylindrical piston 184 is slidably mounted in the chamber 183 and the lower end 185 thereof, slidably engages the inner surface 176 of the bottom plate 155. The slider valve element piston 184 is provided with a suitable O-ring seal 186, which is operatively mounted in an annular groove in the outer periphery of the piston 184. The inner or top end of the piston 184 is indicated by the numeral 187. A coil spring 188 is operatively mounted in the piston bore 183, between the bore upper end 189 and the top end 187 of the piston 184, to bias the piston 184 downwardly, against the inner surface 176 of the bottom plate 155.

As shown in FIG. 7, the slider valve element body 171 is provided with a conical passage which is disposed, convex upwardly, and which includes the lower end portion 192 formed through the piston 184 and an upper end portion 193 formed in the upper end of the slider valve element body 171. The upper end of the passage 193 communicates with a vertical passage 194 which in turn communicates at its upper end with the outlet port passage 168.

It will be understood, that when the valve 150 is in operation, the pressure of the working fluid passing upwardly through the conical passage portions 192 and 193 will also operate in the area between the piston upper end surface 187 and the inner end surface 189 of the piston chamber 183, so as to provide a pressure assist to the spring 188 for moving the piston 184 downwardly into sealing engagement with the inner surface 176 of the valve bottom plate 155, and the upper end surface 174 of the slider valve element body 171 against the upper end of the exhaust or valve chamber 152, to provide a pressure assist seal at that point. The upper end 174 of the slider valve element body 171 slides on the upper end surface of the chamber 152 in a metal to metal sliding contact, without the use of any seal. The lower ends 175 and 185 of the slider valve element body 171 and the piston 184, respectively, also slide in a metal to metal sliding contact on the inner surface 176 of the valve bottom plate 155, without the use of any seal.

The slider valve element means 170 is movable between the first and second operating positions, as described hereinafter, in the same manner as the previously described embodiments, by an operator biasing means, as a return spring means, generally indicated by the numeral 195 and a cylindrical piston type operator means, generally indicated by the numeral 196.

As shown in FIG. 7, the spring return means 195 biases the slider valve element means 170 to a first operating position wherein the piston operator means 196 is inoperative. The slider valve element body 171 is provided with an integral operator shaft 197, which has its outer end in abutment against the inner end 198 of an operator piston 199. As shown in FIG. 7, the operator piston 199 is slidably mounted through a bore 200 in the right end of the valve body 151, with its inner end protruding through the inner end wall 154 of the exhaust and valve chamber 152, and into the same. The operator piston 199 includes an integral enlarged piston head 203, which is slidably mounted in a cylindrical bore or chamber 204 in a piston operator housing 205. The piston bore 204 extends inwardly into the housing 205 from the inner end thereof, and it terminates at an inner end wall 202. When the slider valve element means 170 is in the first operating position, shown in FIG. 7, the outer end of the operator piston head 203 seats against the bore end wall 202. The operator piston head 203 is provided with an annular O-ring seal 206, which is operatively mounted in a suitable groove formed around the periphery of the piston head 203. The operator piston housing 205 is releasably secured to the right end of the valve body 151, as viewed in FIG. 7, by a plurality of suitable machine screws 207 which extend through the housing 205 and into threaded engagement with a suitable threaded bore in the valve body 151.

As shown in FIG. 7, the piston operator housing 205 is provided on its outer end with a threaded pilot fluid inlet port 208, which communicates at its inner end with the operator piston cylindrical bore 204.

The return spring means 195 includes a return spring piston 219 which is slidably mounted in a bore 220 formed through the left side of the valve body 151, as viewed in FIG. 7. The inner end 218 of the return spring piston 219 abuts against an operator shaft 217, which is integrally formed on the left end of the slider valve element body 171, as viewed in FIG. 7. The return spring means 195 further includes a spring retainer 225, which is releasably secured to the left end of the valve body 151 by a plurality of suitable machine screws 228.

As shown in FIG. 7, the return spring piston 219 has a cylindrical spring chamber 221 formed therein, which extends inwardly from its outer end. A return spring 222 is seated in the spring chamber 221, with the inner end thereof abutting the inner end wall 223 of the spring chamber 221. The outer end of the return spring 222 is seated in a cylindrical recess 226 which is formed at the outer end of a larger diameter bore 224, which extends outwardly into the retainer body 225 from the inner end thereof. The cylindrical recess 226 and bore 224 are vented to the atmosphere by an axial vent bore 227.

As illustrated in FIG. 7, pressurized pilot fluid is conducted to the pilot fluid inlet port 208 by a suitable conduit 211, which is connected to a directional control valve, generally indicated by the numeral 212. The directional control valve 212 is a conventional type valve, and it has an exhaust line 213, and a supply line 214 connected to a suitable source of pressurized pilot fluid.

In use, when the directional control valve 212 is in the first operating position shown in FIG. 7, the pilot fluid would be exhausted from the operator chamber or bore 204. When the directional control valve 212 is moved to the right, as viewed in FIG. 7, by any suitable means, as by a manual means or a solenoid operated means, the operator chamber or bore 204 is connected to the source of pilot fluid by the supply lines 211 and 214, and pressurized pilot fluid is conducted into the operator chamber or bore 204 for moving the operator piston 199 to the left until the enlarged piston head 203 abuts the left end of the chamber 204, as viewed in FIG. 7, to move the slider valve element 170 to a second operating position.

In the first operating position shown in FIG. 7, the slider valve element means 170 has its lower end passage 192 in communication with the pressure inlet port 162, and its upper end passage 194 in communication with the outlet port passage 168 and the outlet port 167. The outlet port 165 is in communication with the exhaust or oil return port 163 through the passage 166, the passage 177 and the chamber 152. When the slider valve element means 170 is moved to the second position to the left from the position shown in FIG. 7, the slider valve element body 171 then connects the inlet port 162 with the outlet port 165 through the outlet passage 166 and the valve element body 171. Simultaneously, the outlet port 167 is connected through the passage 168 and the exhaust chamber 152 to the exhaust or oil return port 164.

When it is desired to move the slider valve element means 170 back to the first operating position, shown in FIG. 7, the directional control valve 212 is reversed to move it back to the position shown in FIG. 7, so as to cut off the supply of pressurized pilot fluid to the operator chamber 204 and exhaust the pressurized fluid that is within that chamber, and permit the return spring means 195 to return the slider valve element means 170 to the first operating position shown in FIG. 7.

It will be understood, that the longitudinal axis of the inlet port 162 and the longitudinal axes of the outlet ports 165 and 167 are co-planar, and that when the slider valve element means 170 is in either the first or second operating positions, pressurized fluid entering the inlet port 162 passes through the slider valve element body 171 and out one of the respective outlet ports 165 or 167 in a straight through flow path, without the need for making any right angle turns, on either a horizontal plane or a vertical plane. The various parts of the valve 150 may be made from the same suitable materials as set forth hereinbefore for the first embodiment. The numerals 229 designate mounting holes for the reception of mounting bolts or the like to hold the valve in place at a desired operating position.

The pressure assist of the working fluid in the conically shaped slider valve passages 192 and 193 provide the same advantages as set forth hereinbefore under the discussion of the first embodiment.

Figure 8:
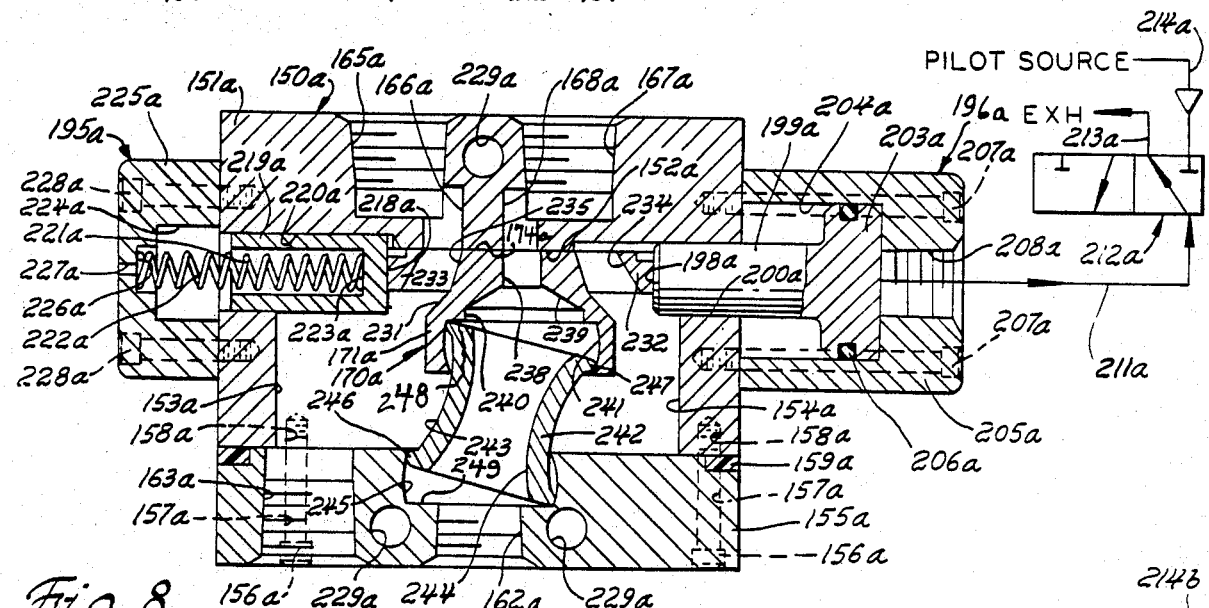
FIG. 8 is a vertical elevation section view, of a fourth embodiment of a valve made in accordance with the principles of the present invention.

FIG. 8 illustrates a fourth valve embodiment, generally indicated by the numeral 150a, made in accordance with the principles of the present invention. The parts of the embodiment of FIG. 8, which are the same as the parts of the embodiment of FIG. 7 have been marked with the same reference numerals followed by the small letter "a". The valve 150a is a four-way, two position, directional fluid control reversing valve having a straight through flow path.

The embodiment of FIG. 8 employs the same valve body 151a, bottom cover 155a, operator biasing means or return spring means 195a and piston operator means 196a as employed in the embodiment of FIG. 7. The difference between the embodiments of FIGS. 8 and 7 is that a different slider valve element means 170a is employed in the embodiment of FIG. 8.

The slider valve element means 170a includes a body member 171a which is block or rectangular shaped in cross section for sliding engagement with the side walls of an exhaust or valve chamber 152a. The slider valve element body 171a has integrally formed on the opposite ends thereof, the horizontally disposed and longitudinally extended operator shafts 232 and 233. The front and rear sides of the slider element body 171a are tapered inwardly, as indicated by the numeral 231. Two exhaust passages, 234 and 235, are formed through the operator shafts 232 and 233, respectively, and they angle downwardly and outwardly, and communicate with the exhaust and valve chamber 152a at their lower ends. The exhaust passages 234 and 235 diverge downwardly relative to each other.

The slider valve element body 171a has an axial vertical passage 238 formed through the upper end thereof. The upper end of the passage 238 terminates at the upper end 174a of the slider valve element body 171a. The lower end of the passage 238 terminates at a conically shaped and enlarged passage 239. The passage 239 terminates at its lower end in an annular passage 240. The passage 240 terminates at its lower end at the upper end of an annular passage 241 which is open at the lower end thereof. The annular passage 241 is circular in cross section and has a concave outwardly shaped wall.

The slider valve element means 170a includes a lower tubular rocker member or conduit rocker member 242, which has its upper end disposed in the passage or chamber 241. The lower end of the conduit rocker member 242 is disposed in an annular chamber or passage 245, which is formed in the upper side of the valve bottom plate 155a, and which is open at the upper end thereof, and which communicates at its lower end with the threaded inlet port 162a. The outer peripheral or vertical wall of the chamber 245 is formed or shaped concave outwardly. The lower end of the conduit 242 is rockably mounted in the chamber 245, and the upper end of the conduit rocker member 242 is rockably mounted in the chamber 241 in the slider valve element body 171a. A rounded and laterally outward extended ridge 246 is formed on the outer lower edge of the conduit rocker member 242, and it slidably and rockably engages the concave wall surface of the chamber 245. A similar rounded ridge 247 is also formed around the periphery of the upper outer side edge of the conduit rocker member 242, and it rockably and slidably engages the concave side wall surface of the chamber 241.

FIG. 8 shows the slider valve element means 170a in a first operating position and it is biased to that position by the operator biasing means or return spring means 195a. In the first operating position shown in FIG. 8 pressurized fluid entering the inlet port 162a is conveyed upwardly through the chamber 245 and through the venturi shaped, longitudinal passage 244 which is formed through the conduit rocker member 242.

As shown in FIG. 8, the outside wall surface 243 of the conduit rocker member 242 is formed concave inwardly while the inner passage 244 therethrough has convexly shaped walls to provide a venturi effect for fluid flowing through the conduit rocker member 242.

The fluid passes upwardly from the passage 244 and into the chamber 241 and the passages 240 and 238, and into the outlet port passage 168a, and thence out the outlet port 167a. Simultaneously, fluid is exhausted as it enters the other outlet port 165a and passes downwardly through the passage 166a, the passage 235 and the chamber 152a and thence out the exhaust port 163a. When the pressurized fluid is admitted by the fluid directional control valve 212a into the pilot port 208a, the operator piston 199a moves to the left, as viewed in FIG. 8, and moves the slider valve element means 170a to the left to align the passage 238 in the slider valve element body 171a with the outlet passage 166a and the outlet port 165a. During the movement of the slider valve element means 170a from the first position shown in FIG. 8 to a second operating position to the left, it will be seen that the conduit rocker member 242 rocks from the position shown in FIG. 8 to assume a position to the left in accordance with the travel distance of the slider valve element body 171a, which is determined by the length of movement of the operator piston head 203a between its initial position shown in FIG. 8, and a second position against the outer end wall of the valve body 151a. In the first operating position, the conduit rocker member 242 has one portion of the upper end edge thereof abutting the shoulder 248 in the chamber 241 and one portion of the lower end edge thereof abutting the shoulder 249 in the chamber 245. When the conduit rocker member 242 is moved to the second operating position the diametrical opposite upper and lower edges thereof abut the shoulders 248 and 249, respectively. The various parts of the valve 150a would be made from the same material as discussed hereinbefore during the discussion of the prior valve embodiments.

Figure 9:
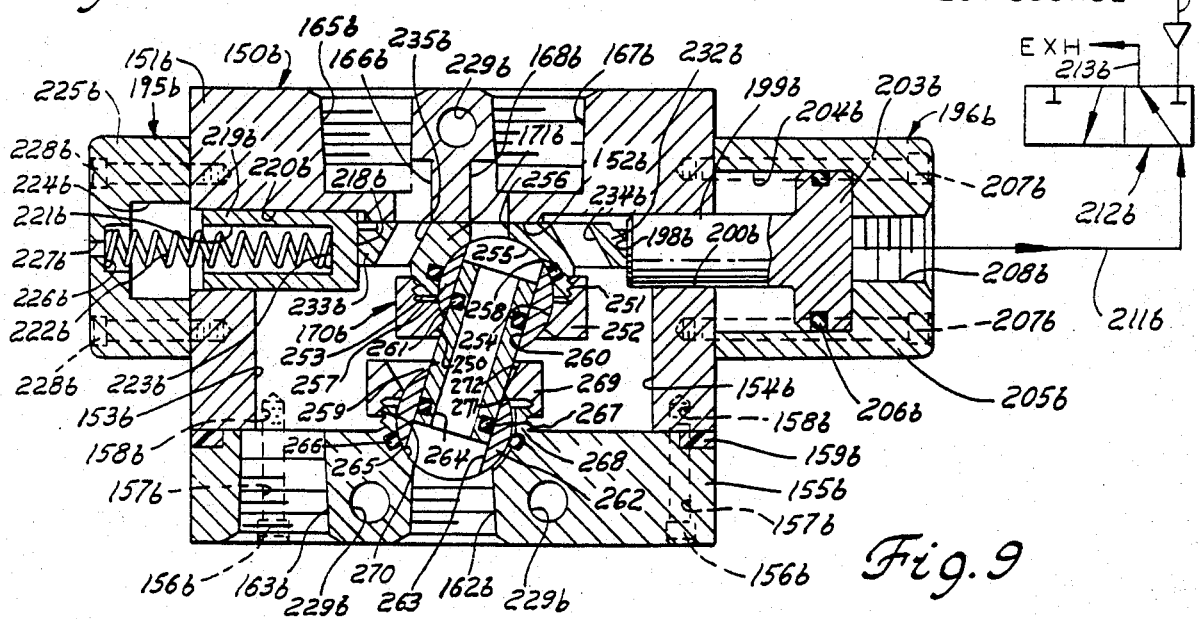
FIG. 9 is a vertical elevation section view, of a fifth embodiment of a valve made in accordance with the principles of the present invention.

FIG. 9 illustrates a fifth valve embodiment, generally indicated by the numeral 150b, made in accordance with the principles of the present invention. The parts of the embodiment of FIG. 9, which are the same as the parts of the embodiments of FIGS. 7 and 8 have been marked with the same reference numerals followed by the small letter "b". The valve 150b is a four-way, two position, directional fluid control reversing valve having a straight through flow path.

The embodiment of FIG. 9 employs the same valve body 151b, bottom cover 155b, operator biasing means or return spring means 195b and piston operator means 196b, as employed in the embodiment of FIG. 7. The diference between the embodiments of FIGS. 9 and 7 is that a different slider valve element means 170b is employed in the embodiment of FIG. 9.

The slider valve element means 170b includes a body member 171b, which is block or rectangular shaped in cross section for sliding engagement with the side walls of an exhaust or valve chamber 152b. The slider valve element body 171b has integrally formed on the opposite ends thereof, the horizontally disposed and longitudinally extended operator shafts 232b and 233b. Two exhaust passages, 234b and 235b, are formed through the operator shafts 232b and 233b, respectively, and they angle downwardly and outwardly, and communicate at their lower ends with the exhaust and valve chamber 152b. The exhaust passages 234b and 235b diverge downwardly relative to each other.

The slider valve element body 171b has formed through the upper end thereof a vertical outlet passage 256 which is connected with the inlet port 162b through a lower, tubular rocker member or conduit rocker member 259. The upper end of the conduit rocker member 259 is operatively connected by a rotatable or rocker connection means to the lower end of the slider valve element body 171b, and by a second rotatable or rocker connection means to the inner side of the valve body bottom cover plate 155b.

As shown in FIG. 9, a concave recess or chamber 255 is formed in the lower end of the slider valve element body 171b and forms a seat for the oscillating or rocker seating of an upper ball-shaped connection member 257. The ball-shaped connection member 257 is operatively retained in the ball-shaped seat 255 by a retainer member 252, which has an internal threaded bore 253 formed in the upper end thereof, for threadably mounting on the outer threaded periphery 251 on the lower end of the slider valve element body 171b. The retainer member 252 is provided with a mating ball-shaped concave seat 254, which communicates with the bore 253 and which is complementary to the valve seat 255 for the reception of the ball-shaped connection member 257. The ball-shaped seat 254 in the retainer member 252 communicates through an opening 250 to the lower exterior of the retainer member 252. The upper end of the conduit rocker member 259 extends upwardly through the opening 250, and into a sliding engagement with a bore 260 formed through the ball-shaped connection member 257. A suitable O-ring seal 261 is mounted in an annular groove formed around the periphery of the upper end of the conduit rocker member 259 for sealing engagement with the bore 260 formed through the ball-shaped connection member 257. An O-ring seal 258 is mounted in the ball-shaped seat 255 in the slider valve element body 171b for sealing engagement with the outer periphery of the ball-shaped connection member 257.

As shown in FIG. 9, the lower end of the conduit rocker member 259 is slidably mounted in a bore 263 in a lower ball-shaped connection member 262. The conduit rocker member 259 has an axial bore 264 formed therethrough, which communicates at its upper end with the upper end of the bore 260 in the upper ball-shaped connection member 257, and which has its lower end in communication with the bore 263 in the lower ball-shaped connection member 262 for communicating the inlet port 162b with the upper inlet passage 256. The lower ball-shaped connection member 262 is seated in a concave recess or chamber 265, which is formed in the upper end of the valve bottom cover 155b and partially in an upstanding integral tubular extension 268 which is threaded on its outer peripheral surface. An O-ring seal 266 is mounted in the ball-shaped seat 265 in the bottom cover 155b for sealing engagement with the outer periphery of the lower ball-shaped connection member 262. A suitable O-ring seal 267 is mounted in an annular groove formed around the periphery of the lower end of the conduit rocker member 259 for sealing engagement with the bore 263 formed through the ball-shaped connection member 262. The ball-shaped connection member 262 is operatively retained in the ball-shaped seat 265 by a retainer member 269, which has an internal threaded bore 270 formed in the lower end thereof for threadably mounting on the outer threaded periphery of the tubular extension member 268. The retainer member 269 is provided with a mating ball-shaped concave seat 271, which is complementary to the valve seat 265 for the reception of the ball-shaped connection member 262. The ball-shaped seat 271 in the retainer member 269 communicates through an opening 272 to the upper exterior of the retainer member 269.

FIG. 9 shows the slider valve element means 170b in a first operating position, and it is biased to that position by an operator biasing means or return spring means 195b. In the first operating position shown in FIG. 9, pressurized fluid entering the inlet port 162b is conveyed upwardly through the conduit rocker member 259 and thence through the passages 256 and 168b and out through the outlet port 167b. Simultaneously, fluid is exhausted as it enters the other inlet port 165b and passes downwardly through the passages 166b and 235b and through the chamber 152b and thence out the exhaust port 163b. When pressurized fluid is directed by the fluid directional control valve 212b into the pilot port 208b, the operator piston 199b moves to the left, as viewed in FIG. 9, and moves the slider valve element means 170b to the left to align the passage 256 in the slider valve element body 171b with the outlet passage 166b and the outlet port 165b. During the movement of the slider valve element means 170b from the first position shown in FIG. 9 to a second operating position to the left, it will be seen that the conduit rocker member 259 is rocked from the position shown in FIG. 9 to assume a position to the left in accordance with the travel distance of the slider valve element body 171b, which is determined by the length of movement of the operator piston head 203b, between its initial position shown in FIG. 9, and a second position against the outer end wall of the valve body 151b. It will be understood, that when the conduit rocker member 259 is moved between the first and second operating positions, that the upper ball-shaped connection member 257 and the lower ball-shaped connection member 262 oscillate in their respective ball-shaped seats. It will be understood, that the longitudinal axes of the inlet ports 162a and 162b of the embodiment of FIGS. 8 and 9, respectively, and the longitudinal axes of the outlet ports 165a and 167a, and 165b and 167b, are co-planar with the inlet ports 162a and 162b, respectively, and that the pressurized fluid entering the inlet ports 162a and 162b pass through their respective slider valve element means 170a and 170b, respectively, in a straight through flow path. The various parts of the valves 150a and 150b may be made from the same suitable materials as set forth hereinbefore for the first embodiment.

In the embodiment of FIG. 8, the conduit rocker member 242 is provided with a transverse or lateral outwardly directed pressure assist, in the sealing action between the rounded ridges 246 and 247, and the concave surfaces of the chambers 245 and 241, respectively, due to the pressurized fluid flowing through the conduit rocker member 242 when the valve 150a is in operation. A similar pressure assist sealing action is present in the valve 150b of FIG. 9, when pressurized fluid is flowing through the conduit rocker member 259. The pressurized fluid flowing through the conduit rocker member 259 exerts a transverse or lateral outwardly directed pressure on the wall of the rocker member 259 to assist in the sealing action against the surfaces 260 and 263, as well as creating an outward sealing pressure on the ball members 257 and 262 which engage the seals 258 and 266, respectively.

INDUSTRIAL APPLICABILITY

The valve of the present invention is adapted for use in industrial air and hydraulic fluid directional control valves of the two-way, three-way or four-way, two and three-position types, and the like, for directing fluid flow to control apparatuses, such as cylinders, for machine tool operations, and other industrial applications.

I claim:

1. A reversing fluid direction control valve, characterized in that it includes:
   (a) a valve body having an enclosed chamber therein and at least two oppositely disposed sides;
   (b) outlet port means formed through one of said two sides of said valve body and communicating with said chamber;

(c) an inlet port means formed through the other of said two sides of said valve body, and communicating with said chamber;

(d) exhaust port means in the valve body and connecting said chamber to the exterior of the valve body;

(e) a slider valve element means disposed in said chamber and being movable between a first operating position and a second operating position, for selectively directing pressurized fluid entering said inlet port means to said outlet port means in a straight through flow path;

(f) passage means for conducting fluid entering said outlet port means to the exhaust port means;

(g) operator means for moving said slider valve element means to said first operating position and to said second operating position;

(h) the valve body includes a bottom side wall, and a top side wall having a lower side surface;

(i) said outlet port means is formed through said top side wall, and the inlet port means is formed through said bottom side wall; and, (j) said slider valve element means includes, (1) a slider valve element body provided with an inlet passage therethrough for selective communication with said inlet port means, and being slidably mounted in said chamber and having one end slidably engaging the top said wall lower side surface when it is moved between said first and second operating positions; and, (2) a conduit rocker member having its upper end rockably connected to the other end of the slider valve element body, and with its lower end rockably connected to the valve body bottom side wall, and wherein said conduit rocker member is provided with an inlet passage therethrough which communicates at the upper end thereof with the inlet passage through the slider valve element body and which communicates at the lower end thereof with the inlet port means in the valve body bottom side wall.

2. A reversing fluid directional control valve, as defined in claim 1, characterized in that:

(a) the slider valve element body is provided on said other end thereof with a recess which opens downwardly therefrom and communicates at its upper end with said inlet passage through the slider valve element body, and which recess is provided with a concave outwardly shaped side wall;

(b) said valve body bottom side wall has a recess extending downwardly from the upper inner end thereof and which communicates with said inlet port means, and wherein said last mentioned recess is provided with a concave outwardly shaped side wall; and, (c) the upper end of said conduit rocker member is rockably mounted in the recess in the lower end of said slider valve element body, and the lower end of said conduit rocker member is rockably mounted in the recess in the valve body bottom side wall.

3. A reversing fluid directional control valve, as defined in claim 2, characterized in that:

(a) the conduit rocker member is provided with a side wall which is shaped concave inwardly and wherein the passage through the conduit rocker member has convexly shaped side walls to produce a venturi-shaped inlet flow passage through the conduit rocker member.

4. A reversing fluid directional control valve, as defined in claim 3, characterized in that:

(a) each of the upper and lower ends of said conduit rocker member has a rounded laterally outward extended peripheral ridge which slidably enages the surface of its respective recess during a rocking movement in the same.

5. A reversing fluid directional control valve, as defined in claim 1, characterized in that:

(a) the slider valve element body is provided on said other end thereof with a ball-shaped recess seat which opens downwardly therefrom and communicates at its upper end with said inlet passage through the slider valve element body;

(b) said valve body bottom side wall has a ball-shaped recess seat extending downwardly from the upper inner end thereof, and which communicates with said inlet port means;

(c) an upper ball shaped connection member is rockably mounted in the ball-shaped recess seat formed in the slider valve element body, and a lower ball-shaped connection member is rockably mounted in the ball-shaped recess seat formed in the valve body bottom side wall, and each of said ball-shaped connector members is retained in place in its respective ball-shaped seat recess for rocking movement therein by a releasably mounted retainer member having a complementary ball-shaped recess seat; and, (d) the upper end of said conduit rocker member is slidably mounted in the passage through the upper ball-shaped connection member and the lower end of said conduit rocker member is slidably mounted in the passage formed through the lower ball-shaped connection member.

* * * * *